United States Patent
Tsuchiya et al.

(10) Patent No.: US 9,555,355 B2
(45) Date of Patent: Jan. 31, 2017

(54) MANUFACTURING METHOD FOR HONEYCOMB STRUCTURE AND HONEYCOMB STRUCTURE

(71) Applicant: NGK Insulators, Ltd., Nagoya (JP)

(72) Inventors: Yusuke Tsuchiya, Nagoya (JP); Hiroyuki Suenobu, Nagoya (JP); Masaki Houra, Nagoya (JP); Yuichi Hamazaki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 14/227,255

(22) Filed: Mar. 27, 2014

(65) Prior Publication Data

US 2014/0290196 A1    Oct. 2, 2014

(30) Foreign Application Priority Data

Mar. 29, 2013 (JP) ................. 2013-073178

(51) Int. Cl.
 *B01D 39/06* (2006.01)
 *B01D 39/14* (2006.01)
 (Continued)

(52) U.S. Cl.
 CPC ......... *B01D 46/0001* (2013.01); *B01D 46/244* (2013.01); *C04B 35/195* (2013.01);
 (Continued)

(58) Field of Classification Search
 CPC  B01D 46/244; B01D 46/2459; C04B 38/0012
 See application file for complete search history.

(56) References Cited

U.S. PATENT DOCUMENTS

2005/0221974 A1*  10/2005  Tomita .................... 501/141
2006/0029768 A1*  2/2006  Furukawa et al. ........ 428/116
(Continued)

FOREIGN PATENT DOCUMENTS

EP    2 335 797 A1    6/2011
EP    2 540 370 A1    1/2013
(Continued)

OTHER PUBLICATIONS

JP2011230028 English Translation, published Nov. 17, 2011, Hayashi et al.*

(Continued)

*Primary Examiner* — Amber R Orlando
(74) *Attorney, Agent, or Firm* — Burr & Brown, PLLC

(57) ABSTRACT

Provided is a technique to manufacture a honeycomb structure reducing a width of dimensional difference generated during firing between an end part and a central part and having excellent thermal shock resistance, and the method includes: a honeycomb formed body preparing step of extruding a kneaded material including a cordierite forming raw material A, to prepare a formed body; a plugged honeycomb formed body preparing step of filling cell openings thereof with a plugging material which includes a forming raw material containing a cordierite forming raw material B and resin balloon of 1.0 to 15 mass % and has a difference in firing shrinkage rate of −1.0 to +2.0% from the formed body, to prepare a plugged formed body; and a honeycomb structure preparing step of firing the prepared plugged formed body, to prepare a honeycomb structure provided with porous plugged portions.

13 Claims, 1 Drawing Sheet

(51) Int. Cl.
*B01D 39/20* (2006.01)
*B01D 24/00* (2006.01)
*B01D 46/00* (2006.01)
*C04B 35/195* (2006.01)
*C04B 38/00* (2006.01)
*B01D 46/24* (2006.01)

(52) U.S. Cl.
CPC ...... *C04B 38/0006* (2013.01); *C04B 38/0012* (2013.01); *C04B 2235/3217* (2013.01); *C04B 2235/3218* (2013.01); *C04B 2235/349* (2013.01); *C04B 2235/3418* (2013.01); *C04B 2235/3445* (2013.01)

(56) References Cited

U.S. PATENT DOCUMENTS

| | | | |
|---|---|---|---|
| 2006/0062961 A1* | 3/2006 | Kaneda | C04B 38/0006 428/116 |
| 2006/0150598 A1 | 7/2006 | Ichikawa et al. | |
| 2007/0039298 A1* | 2/2007 | Tokumaru | 55/523 |
| 2007/0044444 A1 | 3/2007 | Oshimi | |
| 2007/0269634 A1 | 11/2007 | Suenobu et al. | |
| 2008/0124516 A1 | 5/2008 | Noguchi et al. | |
| 2008/0264010 A1* | 10/2008 | Mizuno et al. | 55/350.1 |
| 2008/0295469 A1* | 12/2008 | Mizuno | B01D 46/2429 55/479 |
| 2010/0242426 A1* | 9/2010 | Ohara et al. | 55/523 |
| 2010/0247853 A1* | 9/2010 | Ichikawa et al. | 428/116 |
| 2010/0252497 A1* | 10/2010 | Ellison et al. | 210/500.1 |

FOREIGN PATENT DOCUMENTS

| | | |
|---|---|---|
| JP | 2010-221189 A | 10/2010 |
| JP | 2011-230028 A | 11/2011 |
| JP | 2013-049009 A | 3/2013 |
| WO | 2004/085029 A1 | 10/2004 |
| WO | 2012/014684 A1 | 2/2012 |

OTHER PUBLICATIONS

Extended European Search Report (Application No. 14162369.4) dated Sep. 26, 2014.
Japanese Office Action, Japanese Application No. 2013-073178, dated Mar. 31, 2015 (3 pages).
European Office Action (Application No. 14162369.4) dated Aug. 9, 2016.

* cited by examiner

MANUFACTURING METHOD FOR HONEYCOMB STRUCTURE AND HONEYCOMB STRUCTURE

The present application is an application based on JP-2013-073178 filed on Mar. 29, 2013 with the Japanese Patent Office, the entire contents of which are incorporated herein by reference.

BACKGROUND OF THE INVENTION

Field of the Invention

The present invention relates to a method for manufacturing a honeycomb structure capable of using as an exhaust gas purification filter and relates to a honeycomb structure.

Description of Related Art

Heretofore, honeycomb structures have been used as a trapping filter to remove particulate matter (PM) discharged from a diesel engine or the like. As a honeycomb structure used as a trapping filter for particulate matter, there has been used a plugged honeycomb structure provided with plugged portions at predetermined position of the both end faces.

Herein, a plugged honeycomb structure includes a honeycomb structure part having porous partition walls defining a plurality of cells serving as through channels of fluid, and plugged portions provided with an end part of a predetermined cell (first cell) on the fluid inflow-side and with an end part of a remaining cell (second cell) on the fluid outflow-side. These plugged portions are generally arranged so that the first cell and the second cell are alternately arranged to form a so-called checker board pattern. According to such a plugged honeycomb structure, when exhaust gas flows into the cells from the end face on the exhaust gas inflow side, the exhaust gas flowing into the cells passes through the partition wall. Then, as the exhaust gas passes through the partition wall, the PM contained in the exhaust gas is trapped by the partition wall. Therefore, the exhaust gas passing through the partition wall is discharged as purified gas.

The plugged honeycomb structure is prepared by filling a plugging material serving as a material of the plugged portions into cell openings of the honeycomb formed body, which is formed into a honeycomb shape with a use of kneaded material, followed by firing. A ceramic raw material is contained both in the kneaded material serving as a material of the honeycomb formed body and in the plugging material serving as a material of the plugged portions, but there is a difference in firing shrinkage rate between the honeycomb formed body and the plugging material during firing.

As a case where there is a difference in firing shrinkage rate between the honeycomb formed body and the plugging material during firing, it can be divided broadly into a case, where the shrinkage of the honeycomb formed body is larger than that of the plugging material during firing, and the opposed case, where the shrinkage of the plugging material is larger than that of the honeycomb formed body during firing.

When the honeycomb formed body shrinks more than the plugging material, in the honeycomb structure obtained after firing, the shrinkage at end face part having a plugged portion is smaller than the central part having no plugged portion. This is because that a plugging material does not shrink so much as the honeycomb formed body during firing, and hence the end face part of the honeycomb formed body is constrained by the low shrinkage of the plugging material. Therefore, a diameter at the end face part of the honeycomb structure becomes larger than that at the central part. As a result, honeycomb structure should have originally in cylindrical shape, but it becomes a concave drum shape. When the deformation of such a concave drum shape is remarkable, it becomes impossible to keep the diameter of the honeycomb structure within predetermined dimensional tolerance. Therefore, it becomes necessary to grind the outer periphery of the honeycomb structure to a cylindrical shape after firing, and then to perform the outer coating.

In addition, when the honeycomb formed body shrinks more than the plugging material, the end face part of the honeycomb formed body is constrained by the low shrinkage of plugging material as stated above, and hence compressive stress remains in the end face part of the honeycomb structure obtained after firing. However, this residual compressive stress hardly causes a problem of decrease in thermal shock resistance in the honeycomb structure. This is because that, when the honeycomb structure is used as a filter for trapping particulate matter, the compressive stress remaining in the end face part is offset by tensile stress generated at the time of burning and removing the deposited particulate matter.

On the other hand, when the plugging material shrinks more than the honeycomb formed body, a plugging material excessively shrinks at the end face part. Therefore, a gap is often generated between the plugged portion and the partition wall at the end face part of the honeycomb structure obtained after firing. Such a gap may cause the lacking of the plugged portion or cause the leakage of particulate matter when the honeycomb structure is used as a filter for trapping particulate matter. Moreover, when the plugging material shrinks more than the honeycomb formed body, there is a case where the aforementioned gap is not generated, but in such a case, the end face part having the plugged portion shrinks more than the central part having no plugged portion. This is because that plugging material shrinks more than the honeycomb formed body during firing, and hence the end face part of the honeycomb structure is constrained by the high shrinkage of the plugging material. As a result, the honeycomb structure should have originally in cylindrical shape, but it becomes a barrel shape. When the deformation of such a barrel shape is remarkable, it becomes impossible to keep the diameter of the honeycomb structure within predetermined dimensional tolerance. Therefore, it becomes necessary to grind the outer periphery of the honeycomb structure to a cylindrical shape after firing, and then to perform the outer coating.

In addition, when the plugging material shrinks more than the honeycomb formed body, the end face part of the honeycomb formed body is constrained by the high shrinkage of plugging material as stated above, and hence tensile stress remains in the end face part of the honeycomb structure obtained after firing. When a honeycomb structure is used as a filter to trap particulate matter, high heat is generated inside the honeycomb structure at the time of burning and removing the deposited particulate matter. The honeycomb structure is expanded due to this high heat, and hence high tensile stress is generated in the honeycomb structure. As stated above, when tensile stress remains in the end face part of the honeycomb structure by a difference in firing shrinkage rate between the honeycomb formed body and the plugging material, it would be overlapped to the tensile stress resulting from the burning of the particulate matter. Thus generated overlapped tensile stress might be exceeded the structural strength of the honeycomb structure. Consequently, when the plugging material shrinks more than the honeycomb formed body, thermal shock resistance might be reduced in the honeycomb structure obtained after firing.

In order not to reduce the thermal shock resistance of the honeycomb structure, it is needed to limit the difference in firing shrinkage rate between the plugging material and the honeycomb formed body to a predetermined value or less. Under such a background, there has been proposed a method for manufacturing a plugged honeycomb structure, wherein a difference in firing shrinkage rate between the honeycomb formed body and the plugging material is 7% or less (Patent Document 1).

[Patent Document 1] WO 2004/085029

SUMMARY OF THE INVENTION

However, even though the above method for manufacturing a plugged honeycomb structure is used, in the plugged honeycomb structure immediately after firing, width at the end part in the cell extending direction (diameter of the end face) still might be too large or too small compared with the width at the central part.

Additionally, since the honeycomb formed body is formed by extrusion, the partition wall of the honeycomb formed body has high degree of compression density and crystals tend to be oriented in the partition wall of the honeycomb structure obtained after firing. On the other hand, since the plugging material is simply pressed into the cell openings of the honeycomb formed body, the plugging material filled into the cell openings has low degree of compression density and orientation of crystals is hard to occur at the plugged portion obtained after firing. To reflect such differences, even when a ceramic raw material having the same composition are used in the honeycomb formed body and the plugging material, there would occur a difference in firing shrinkage rate between the honeycomb formed body and the plugging material. Therefore, in the aforementioned method for manufacturing a plugged honeycomb structure, while a difference in firing shrinkage rate between the honeycomb formed body and the plugging material is 7% or less, it is actually very difficult to keep the difference in firing shrinkage rate between the honeycomb formed body and the plugging material within the range of −2.0 to +2.0%.

Then, when it is impossible to keep the difference in firing shrinkage rate between the honeycomb formed body and the plugging material within the range of −2.0 to +2.0%, it is needed to a step for grinding the outer periphery of the plugged honeycomb structure after firing, to adjust the size and the shape. In the case of grinding the outer periphery, it is needed to form an outer peripheral wall by applying the coating at the ground face. Especially in a conventional plugged honeycomb structure, it is essential to perform the outer grinding and outer coating when increasing the size.

Furthermore, even when the outer peripheral coating is not required by keeping the difference in firing shrinkage rate between the honeycomb formed body and the plugging material within the range of −2.0 to +2.0%, in the obtained honeycomb structure, thermal shock resistance might be poor.

The present invention provides the following method for manufacturing a honeycomb structure and the following honeycomb structure.

According to one aspect of the present invention, a method for manufacturing a honeycomb structure includes: a honeycomb formed body preparing step of extruding a kneaded material obtained by kneading a forming raw material containing a cordierite forming raw material A into a honeycomb shape is provided, to prepare a honeycomb formed body having partition walls defining a plurality of cells extending from a first end face as one end face to a second end face as another end face; a plugged honeycomb formed body preparing step of filling the cell openings of the prepared honeycomb formed body with a plugging material which includes a forming raw material containing a cordierite forming raw material B and resin balloon of 1.0 to 15 mass % and has a difference in firing shrinkage rate of −1.0 to +2.0% from the honeycomb formed body, to prepare a plugged honeycomb formed body; and a honeycomb structure preparing step of firing the prepared plugged honeycomb formed body to prepare a honeycomb structure provided with porous plugged portions at an end part on a first end face side of a first cell as a predetermined cell and at an end part on the second end face side of a second cell as a remaining cell, among the plurality of cells.

According to a second aspect of the present invention, the method for manufacturing a honeycomb structure according to the first aspect is provided, wherein the cordierite forming raw material B includes alumina and aluminum hydroxide, and a percentage ratio of the mass of the aluminum hydroxide to sum of the mass of the alumina and the mass of the aluminum hydroxide contained in the cordierite forming raw material B is 20 to 100%.

According to a third aspect of the present invention, the method for manufacturing a honeycomb structure according to the first or second aspects is provided, wherein the cordierite forming raw material B includes talc having an average particle diameter of 5 to 30 μm.

According to a fourth aspect of the present invention, the method for manufacturing a honeycomb structure according to any one of the first to third aspects is provided, wherein the cordierite forming raw material B includes 5 to 20 mass % of silica.

According to a fifth aspect of the present invention, the method for manufacturing a honeycomb structure according to any one of the first to fourth aspects is provided, wherein the cordierite forming raw material B includes silica having an average particle diameter of 1 to 5 μm.

A honeycomb structure obtained by the method for manufacturing a honeycomb structure according to any one of the prior aspects of the present invention.

According to the method for manufacturing a honeycomb structure of the present invention, it is possible to reduce the width of the dimensional size generated during firing between the end part and the central part in the honeycomb structure by using a plugging material which includes a forming raw material containing a ceramic forming raw material and resin balloon of 1 to 15 mass % and has a difference in firing shrinkage rate of −1.0 to +2.0% from the honeycomb formed body. Specifically, it is kept the difference in firing shrinkage rate in diameter between the end parts and the central part in the honeycomb structure within the range of −0.2 to +0.35% (in the case of the absence of a dimensional difference before firing between the end parts and the central part in the honeycomb structure of 143.8 mm in diameter, the range is −0.29 to 0.50 mm).

Moreover, according to the honeycomb structure of the present invention, the shape distortion between the end parts and the central part in the cell extending direction is suppressed. In addition, according to the method for manufacturing a honeycomb structure of the present invention, it promotes the integration of the plugging material and the honeycomb formed body during firing by using a plugging material having a predetermined structure, to prevent the generation of the aforementioned gap.

Furthermore, according to the method for manufacturing a honeycomb structure of the present invention, it is possible to suppress the reduction of thermal shock resistance and to promote the integration of the plugging material and the honeycomb formed body during firing by using a plugging material which includes a forming raw material containing a ceramic forming raw material and resin balloon of 1 to 15 mass % and has a difference in firing shrinkage rate of −1.0 to +2.0% from the honeycomb formed body.

DETAILED DESCRIPTION OF THE PRESENT INVENTION

Figure 1:
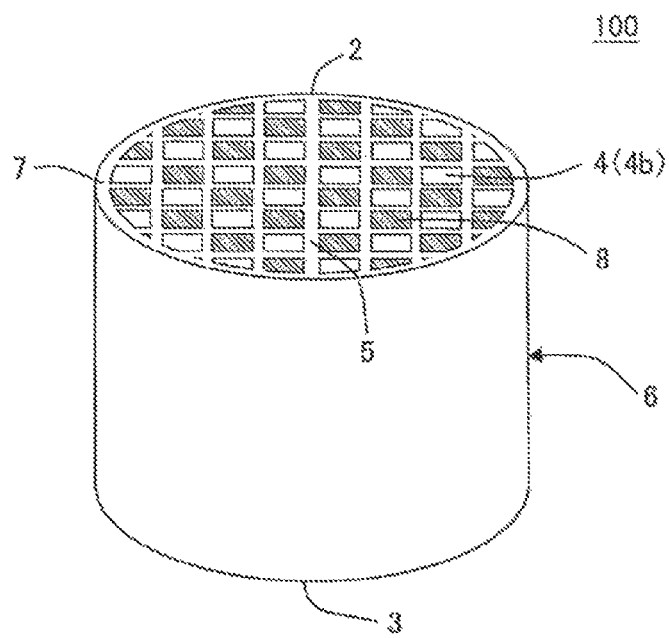
FIG. 1 is a perspective view schematically showing one embodiment of a honeycomb structure of the present invention.

Hereinafter, the embodiments of the present invention are described with reference to the drawings. The present invention is not limited to the following embodiments, and changes, modifications and improvements may be added without departing from the scope of the present invention.

1. Method for Manufacturing a Honeycomb Structure:

One embodiment of a method for manufacturing a honeycomb structure of the present invention includes a honeycomb formed body preparing step, a plugged honeycomb formed body preparing step, and a honeycomb structure preparing step. In the honeycomb formed body preparing step, it extrudes a kneaded material obtained by kneading a forming raw material containing a cordierite forming raw material A into a honeycomb shape. In this extrusion, it forms a honeycomb formed body having partition walls defining a plurality of cells extending from a first end face as one end face to a second face as another end face. In the plugged honeycomb formed body preparing step, a plugged honeycomb formed body is prepared by filling the cell openings in the prepared honeycomb formed body with plugging materials which include a forming raw material containing a cordierite forming raw material B, water, binder, dispersant, surfactant and resin balloon of 1.0 to 15 mass %, and has a difference in firing shrinkage rate of −1.0 to +2.0% from the honeycomb formed body. In the honeycomb structure preparing step, the prepared plugged honeycomb formed body is fired, to prepare a honeycomb structure provided with porous plugged portions at an end part on a first end face side of a first cell as a predetermined cell and at an end part on the second end face side of a second cell as a remaining cell, among the plurality of cells.

According to the method for manufacturing a honeycomb structure of the present embodiment, it is possible to reduce the width of the dimensional size generated during firing between the end part and the central part in the honeycomb structure by using a plugging material which includes resin balloon of 1 to 15 mass % and has a difference in firing shrinkage rate of −1.0 to +2.0% from the honeycomb formed body. In this way, since it is possible to reduce the width of dimensional difference, according to the method for manufacturing a honeycomb structure of the present embodiment, it is possible to omit the steps of grinding outer periphery of the honeycomb structure after firing and coating the ground outer periphery of the honeycomb structure with an outer peripheral coating material.

Hereinafter, each of steps of the method for manufacturing a honeycomb structure of the present embodiment is described in more detail.

1-1. Honeycomb Formed Body Preparing Step:

In the honeycomb formed body preparing step, it extrudes a kneaded material obtained by kneading a forming raw material into a honeycomb shape, to obtain a honeycomb formed body.

The forming raw material is preferably a material prepared by adding dispersion medium and additive to a cordierite forming raw material A. Example of additives includes organic binder, pore former and surfactant. Example of dispersion medium includes water.

The "cordierite forming raw material A" is a ceramic raw material blended to have chemical compositions in the range of 42 to 56 mass % of silica, 30 to 45 mass % of alumina and 12 to 16 mass % of magnesia, and forms cordierite after firing. For instance, a cordierite forming raw material A can be obtained by blending alumina, aluminum hydroxide, kaolin, talc and silica at a predetermined ratio.

Example of organic binder includes methyl cellulose, hydroxypropoxyl cellulose, hydroxyethyl cellulose, carboxymethyl cellulose, or polyvinyl alcohol. Among them, methyl cellulose and hydroxypropoxyl cellulose are preferably used together. The content of the organic binder is preferably 0.2 to 8 parts by mass with respect to 100 parts by mass of the cordierite forming raw material A.

As long as the pore former forms the pores by firing, it is not particularly limited. Example of pore former includes starch, resin balloon, water absorbing resin, silica gel. The content of the pore former is preferably 0.5 to 25 parts by mass with respect to 100 parts by mass of the cordierite forming raw material A.

Ethylene glycol, dextrin, fatty acid soap, or polyalcohol or the like can be used as surfactant. They may be used alone. They also may be used in combination of two or more types. The content of the surfactant is preferably 0.1 to 2 parts by mass with respect to 100 parts by mass of the cordierite forming raw material A.

The content of the dispersion medium is preferably 10 to 100 parts by mass with respect to 100 parts by mass of the cordierite forming raw material A.

The particle diameter as well as the amount of the cordierite forming raw material A (aggregate particles) to be used (e.g., the particle diameters and the amounts of alumina, aluminum hydroxide, kaolin, talc and silica) and the particle diameter as well as the amount of the pore former to be added may have be adjusted. The porous substrate having a desired porosity and average pore size can be obtained by adjusting the particle diameter and the amount of such a pore former.

A method for forming a kneaded material by kneading a forming raw material is not particularly limited. For instance, there is a method using a kneader or a vacuum clay kneader.

In the extrusion, it extrudes a kneaded material into a honeycomb shape, to obtain a honeycomb formed body. The extrusion may be performed by using a die. As to the die, shape of slits (the shape of pins surrounded with slits), slits width, density of the pins and the like may be appropriately designed so as to correspond to the cell shape of the honeycomb formed body, the shape of intersections of the partition wall, the thickness of the partition wall and the cell density. As a material of the die, a super hard metal alloy being hard to wear is preferable.

Thus, a honeycomb formed body can be obtained. The honeycomb formed body has partition walls defining a plurality of cells extending from a first end face as one end face to a second end face as another end face.

1-2. Plugged Honeycomb Formed Body Preparing Step:

A plugging material to be used at the plugged honeycomb formed body preparing step includes a forming raw material containing a cordierite forming raw material B and a resin balloon of 1.0 to 15 mass %. In addition, the plugging material to be used at the plugged honeycomb formed body preparing step has a difference in firing shrinkage rate of −1.0 to +2.0% from the honeycomb formed body.

In the present specification, a "difference in firing shrinkage rate from the honeycomb formed body" means a difference between "a shrinkage rate (%) in dimension before and after firing at the plugging material" and "a shrinkage rate (%) in dimension before and after firing at the honeycomb formed body". Hereinafter, for convenience of explanation, the "difference between "a shrinkage rate (%) in dimension before and after firing at the plugging material" and "a shrinkage rate (%) in dimension before and after firing at the honeycomb formed body"" is referred to as a "difference in firing shrinkage rate". Additionally, when the "shrinkage rate (%) in dimension before and after firing at the plugging material" is negative, it means that the plugging material shrinks by firing. When the "shrinkage rate (%) in dimension before and after firing at the honeycomb formed body" is negative, it means that the honeycomb formed body shrinks by firing. A plugging material and a honeycomb formed body normally tend to shrink by firing. In such a normal case, when the "difference in firing shrinkage rate" is negative, the plugging material shrinks more than the honeycomb formed body by firing.

Example of resin balloon includes copolymer such as vinylidene chloride, acrylonitrile.

The content of resin balloon in the plugging material is normally 1.0 to 15 mass % in terms of solid content as stated above. The porosity can be increased by adding the resin balloon. It is possible to increase the shrinkage during firing by increasing the porosity, i.e., increasing the number of the pores. When the content of resin balloon in the plugging material is less than 1.0 mass %, the porosity is low and cracks easily occur at the boundary between plugged portions and partition walls due to a stiffness difference between the plugged portions and the partition walls. When the content of resin balloon in the plugging material exceeds 15 mass %, the porosity at the plugged portion may become too high or the pore size may become too large. When it is excessive high porosity or excessive large pore size, trapping efficiency might be reduced at the time of using the honeycomb structure as a filter for trapping particulate matter. The content of resin balloon in the plugging material is preferably 1.5 to 13 mass %, and in particular, more preferably 2.0 to 11 mass %. Moreover, when the content of resin balloon is within above ranges, since the resin balloon can hold water content, it is possible to prevent the generation of "sink" at the time of filling the plugging material by "sliding method" described later.

An average particle diameter of the resin balloon is preferably 2 to 200 μm, more preferably 3 to 180 μm, and especially preferably 4 to 160 μm. When the average particle diameter of the resin balloon is within these ranges, pores (communicating pores) penetrating through the plugged portion is appropriately formed. Therefore, when the honeycomb structure is used as a filter for trapping particulate matter, the trapping efficiency can be maintained while suppressing the increase in pressure loss. When the average particle diameter of the resin balloon is less than 2 μm, the number of the communicating pores might be decreased. As a result, the pressure loss might be increased. When the average particle diameter of the resin balloon exceeds 200 μm, the number of the communicating pores might be increased. As a result, the trapping efficiency might be reduced.

The shell wall thickness of the resin balloon is preferably 0.01 to 1.00 μm, more preferably from 0.10 to 0.5 μm, and especially preferably 0.15 to 0.45 μm. When the shell wall thickness of the resin balloon is less than 0.01 μm, the resin balloon might be easy to collapse at the time of filling the plugging material into the honeycomb structure part. Therefore, the effect of pore-forming might be reduced. When the shell wall thickness of the resin balloon exceeds 1.00 μm, the weight of the resin balloon increases, and hence cracks might be easy to occur during firing.

Especially in the method for manufacturing a honeycomb structure of the present embodiment, a cordierite forming raw material A is used as a material of the partition wall and a cordierite forming raw material B is used as a material of the plugged portion (raw material of the plugging material). In this way, the partition wall and the plugged portion are made of the same type of material, whereby the "difference in firing shrinkage rate" is easy to control in the range of −1.0 to +2.0%.

The "cordierite forming raw material A" in the present specification means a cordierite forming raw material included in a material of the partition wall. The "cordierite forming raw material B" in the present specification means a cordierite forming raw material included in a material of the plugged portion (plugging material). In the method for manufacturing a honeycomb structure of the present embodiment, the compositions of the "cordierite forming raw material A" and the "cordierite forming raw material B", depending on the specific embodiment, may be the same or be different.

The cordierite forming raw material B includes alumina and aluminum hydroxide, and the percentage ratio of the mass of aluminum hydroxide to the sum of the mass of alumina and the mass of aluminum hydroxide (hereinafter called "aluminum hydroxide ratio" for convenience of explanation) included in the cordierite forming raw material B is preferably 20 to 100%. The "difference in firing shrinkage rate" can be easy to control by suitably changing the "aluminum hydroxide ratio" in the range of 20 to 100%. In addition, it is possible to increase the shrinkage during firing at the plugged portion by increasing the "aluminum hydroxide ratio". When the "aluminum hydroxide ratio" is less than 20%, a difference in coefficient of thermal expansion tends to occur between the partition wall and the plugged portion. Therefore, when the temperature rises during combustion of soot, cracks are easy to occur at the partition wall near a contacting part with the plugged portion in the honeycomb structure obtained after firing. Incidentally, when the "aluminum hydroxide ratio" is 100%, alumina is not contained in the cordierite forming raw material B.

When the cordierite forming raw material B includes alumina, the average particle diameter of alumina is preferably 0.5 to 20 μm. When the average particle diameter of alumina included in the cordierite forming raw material B is less than 0.5 μm, the sliding inclusive property might be poor when filling the plugging material by the later "sliding method". When the average particle diameter of alumina included in the cordierite forming raw material B exceeds 20 μm, it might be needed to set the longer firing time than typical one. Moreover, the average particle diameter of alumina included in the cordierite forming raw material B is more preferably 1.0 to 15 μm, and is particularly the most preferably 1.5 to 10 μm.

The cordierite forming raw material B preferably includes talc having an average particle diameter of 5 to 30 μm. When the cordierite forming raw material B includes talc having an average particle diameter of 5 to 30 μm, the shrinkage ratio during firing is easy to control, and hence the "difference in firing shrinkage rate" is easy to control in the range of −1.0 to +2.0%. When the average particle diameter of talc included in the cordierite forming raw material B is less than 5 μm, the flow property of the plugging material is poor when filling the plugging material into the cell openings, and hence it might be difficult to make the plugged portion a desired depth. When the average particle diameter of talc included in the cordierite forming raw material B exceeds 30 μm, the shrinkage during firing is hard to occur, and hence it might be difficult to control the "difference in firing shrinkage rate" in the range of −1.0 to +2.0%. The average particle diameter of talc included in the cordierite forming raw material B is more preferably 6 to 28 μm, and is particularly the most preferably 7 to 26 μm.

The cordierite forming raw material B preferably includes silica of 5 to 20 mass %. Herein, the "mass %" represents the ratio when the overall amount of the cordierite forming raw material B is 100 mass %. When the content of silica in the cordierite forming raw material B is less than 5 mass %, the amount of kaolin included in the cordierite forming raw material B is too much, and hence it might be easy for breakage to occur during firing. When the content of silica in the cordierite forming raw material B exceeds 20 mass %, the shrinkage during firing is hard to occur, and hence it might be difficult to adjust the firing shrinkage rate of the plugging material to the firing shrinkage rate of the substrate (honeycomb formed body). Moreover, the content of silica in the cordierite forming raw material B is more preferably 7 to 18 mass %, and is particularly the most preferably 9 to 16 mass %. Herein, the "mass %" represents the ratio when the overall amount of the cordierite forming raw material B of the plugging material is 100 mass %.

In addition, the cordierite forming raw material B preferably includes silica having an average particle diameter of 1 to 5 μm. When the cordierite forming raw material B includes silica having an average particle diameter of 1 to 5 μm, the fitting property between the plugging material and the partition wall is superior when filling the plugging material into the cell openings. Therefore, a gap is hard to generate between the plugged portion and the partition wall after firing. When the average particle diameter of silica included in the cordierite forming raw material B is less than 1 μm, water included in the plugging material is absorbed to the partition wall when filling the plugging material into the cell openings, and accordingly the plugging material is easy to concentrate on the partition wall. As a result, the sink occurs at the plugged portion, whereby it might cause the soot leakage when using the resulting honeycomb structure as a filter. When the average particle diameter of silica included in the cordierite forming raw material B exceeds 5 μm, the fitting property between the plugging material and the partition wall is not sufficient, and hence a gap might occur between the plugged portion and the partition wall. As a result, it might cause leakage of particulate matter when the resulting honeycomb structure is used as a filter for trapping the particulate matter. The average particle diameter of silica included in the cordierite forming raw material B is more preferably 1.5 to 4 μm, and is particularly the most preferably 2 to 3 μm.

The plugging material may include additives such as water, binder, dispersant and surfactant in addition to the forming raw material containing the ceramic raw material and the resin balloon.

The viscosity of plugging material is preferably 30 to 2,000 dPa·s. When the viscosity of the plugging material is 30 to 2,000 dPa·s, it is possible to fill the plugging material into the cell openings sufficiently. In addition, it also can prevent the occurrence of sag of the plugging material when filling the plugging material into the cell openings. When the viscosity of the plugging material is less than 30 dPa·s, the plugging material might sag when filling the plugging material into the cell openings. When the viscosity of the plugging material exceeds 2,000 dPa·s, the filling property of the plugging material into the cell openings deteriorates, and hence it might be impossible to set the plugged portion till a desired depth. Moreover, the viscosity of the plugging material is more preferably 40 to 1,500 dPa·s, and is particularly the most preferably 50 to 1,000 dPa·s.

Next, a plugged portion is formed by filling the plugging material into the honeycomb formed body, to prepare a plugged honeycomb formed body.

First, a predetermined cell among the plurality of cells formed in the honeycomb formed body is defined as a first cell, and a remaining cell is defined as a second cell. Then, as to the first cell, the plugging material is filled at an end part on the first end face side. As to the second cell, the plugging material is filled at an end part on the second end face side.

The following method (it may be called as "a sliding method" for convenience of explanation) can be used when filling the plugging material into the cell openings. A mask is attached to one end face (e.g., the first end face) of the honeycomb formed body. Next, a hole is made at a part of the mask covering the predetermined cell by known means such as a laser. Next, the honeycomb formed body is disposed so that the end face to which the mask is attached (the one end face) faces upward. Next, the above-mentioned plugging material is continuously slid into the upward directed end face. Similarly, the above-mentioned plugging material is filled into another end part of the remaining cell attached with the mask where the hole is made.

Alternatively, the following masking step and press-fitting step may be used. The masking step is a step that a sheet is attached to one end face (e.g., the first end face) of the honeycomb formed body, and a hole is made at a position overlapping with a "cell where a plugged portion is to be formed" in the sheet. The press-fitting step is a step that the plugging material is pressed into the cells of the honeycomb formed body by pressing "end face of the honeycomb formed body on the side where the sheet is attached" into a container storing the plugging material. The plugging material is filled into only the cells communicating with the hole made at the sheet when pressing the plugging material into the cell of the honeycomb formed body.

Next, the plugging material filled in the honeycomb formed body may be dried. The plugging material may be dried after filling the plugging material into the cell openings at both end faces of the honeycomb formed body. Alternatively, the plugging materials may be filled into the cell openings at one end face (e.g., the first end face) of the honeycomb formed body, followed by drying the plugging material, and then the plugging material may be filled into the cell openings at another end face (e.g., the second end face), followed by drying the plugging material.

1-3. Honeycomb Structure Preparing Step:

In the honeycomb structure preparing step, the aforementioned plugged honeycomb formed body is fired. Firing temperature can be appropriately determined depending on the material of the honeycomb formed body. When the material of the honeycomb formed body is cordierite, for example, the firing temperature is preferably from 1,380 to 1,450° C., and more preferably from 1,400 to 1,440° C. Moreover, the firing time is preferably from about 3 to 10 hours.

The honeycomb formed body may be dried prior to firing. The drying method is not particularly limited. Example of the methods includes hot air drying, microwave drying, dielectric drying, reduced-pressure drying, vacuum drying, and freeze-drying. Among them, the dielectric drying, the microwave drying or the hot air drying is preferably performed alone or in combination. Moreover, as to drying conditions, it is preferable that drying temperature is 30 to 150° C. and a drying time is 1 minute to 2 hours.

Moreover, the honeycomb formed body is preferably calcined in advance before firing the honeycomb formed body. The calcination is performed for degreasing, the method is not particularly limited, and it may be needed to remove the organic matters (organic binder, dispersant, pore former and the like) in the honeycomb formed body. Generally, the combustion temperature of organic binder is about 100 to 300° C. and the combustion temperature of pore former is about 200 to 800° C., and hence it is preferably calcined at about 200 to 1,000° C. for about 3 to 100 hours under an oxidation atmosphere as the condition for calcination.

Instead of filling the plugging material into the honeycomb formed body as stated above, the honeycomb formed body may be fired to prepare a honeycomb fired body, and then the plugging material may be filled into an end part of one end face side of a predetermined cell of the honeycomb fired body.

2. Honeycomb Structure:

Next, a honeycomb structure obtained by the method for manufacturing a honeycomb structure of the present embodiment as stated above is described.

Figure 2:
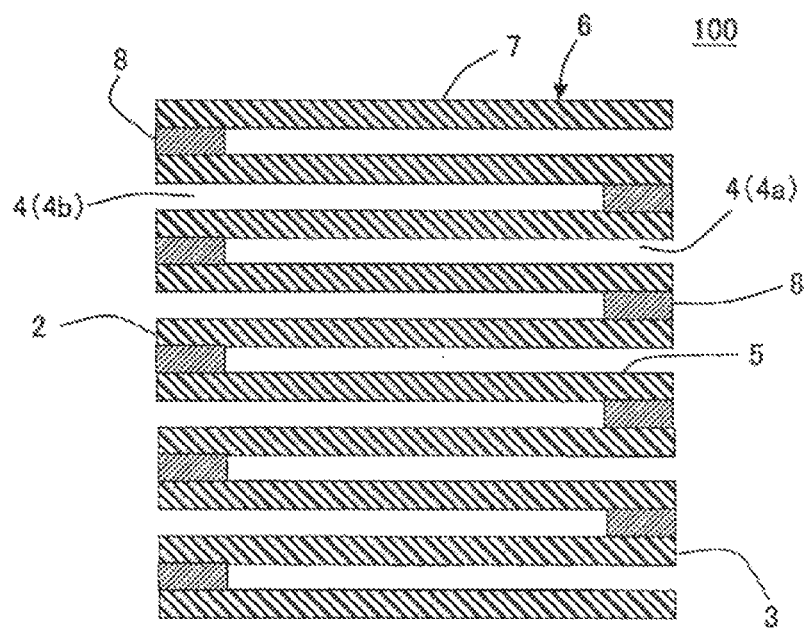
FIG. 2 is a cross-sectional view schematically showing a cross section parallel to the cell extending direction of the honeycomb structure shown in FIG. 1.

One embodiment of the honeycomb structure of the present invention includes, as in a honeycomb structure 100 shown in FIG. 1 and FIG. 2, a honeycomb structure part 6 having porous partition wall 5 and porous plugged portions 8. The partition wall 5 defines a plurality of cells 4 extending from a first end face 2 as one end face to the second end face 3 as another end face and serving as through channels of fluid. The plugged portions 8 are arranged at an end part on the first end face side 2 of a first cell 4a as a predetermined cell and at an end part on the second end face 3 side of a second cell 4b as a remaining cell, among the plurality of cells 4. In the honeycomb structure part 6, the first cell 4a and the second cell 4b are alternately arranged. Therefore, the plugged portions 8 are arranged so as to form a so-called checker board pattern in the first end face 2 and the second end face 3. The honeycomb structure 100 further has an outer peripheral wall 7 at the outer periphery of the honeycomb structure part 6. The honeycomb structure of the present invention does not necessarily need to have the outer peripheral wall 7. FIG. 1 is a perspective view schematically showing one embodiment of a honeycomb structure of the present invention. FIG. 2 is a cross-sectional view schematically showing a cross section parallel to the cell extending direction of the honeycomb structure shown in FIG. 1.

2-1. Honeycomb Structure Part:

The porosity of the partition wall 5 is preferably 30 to 80%, more preferably 35 to 75%, and especially preferably 40 to 70%. When the porosity of the partition wall 5 is within the ranges, it is possible to hold the structural strength of the partition wall 5 while reducing the pressure loss.

In the present specification, the "porosity of the partition wall 5" is a value measured by a mercury porosimeter.

The thickness of the partition wall 5 is preferably 0.05 to 1.25 mm, more preferably 0.075 to 1.00 mm, and especially preferably 0.10 to 0.75 mm. When the thickness of the partition wall 5 is less than 0.05 mm, the structural strength of the partition wall 5 might be insufficient. When the thickness of the partition wall 5 exceeds 1.25 mm, the pressure loss tends to increase.

The "thickness of the partition wall 5" in the present specification means a thickness of the partition wall 5 separating two neighboring cells 4 in a cross section perpendicular to the cell extending direction. The "thickness of the partition wall 5" can be measured by an image analyzer (produced by Nikon, product name: NEXIV, VMR-1515), for example.

The average pore size of the partition wall 5 is preferably 3 to 50 μm, more preferably 5 to 40 μm, and especially preferably 7 to 30 μm. When the average pore size of the partition wall 5 is less than 3 pressure loss tends to increase. When the average pore size of the partition wall 5 exceeds 50 μm, trapping efficiency tends to reduce. The "average pore size of the partition wall 5" in the present specification is a value measured by a mercury porosimeter.

The cell density of the honeycomb structure part 6 is preferably 7.75 to 93.00 cells/cm$^2$, more preferably 15.50 to 77.50 cells/cm$^2$, and especially preferably 23.25 to 62.00 cells/cm$^2$. When the cell density of the honeycomb structure part 6 is less than 7.75 cells/cm$^2$, a contact area between exhaust gas and the honeycomb structure part 6 tends not to obtain sufficiently. When the cell density of the honeycomb structure part 6 exceeds 93.00 cells/cm$^2$, the pressure loss tends to increase. The "cell density" in the present specification is the number of cells per unit area (per 1 cm$^2$) in a cross section perpendicular to the cell extending direction.

The shape of the cells 4 in a cross section perpendicular to the cell extending direction is not particularly limited, and example of the shapes are a polygonal shape such as a quadrangular shape, a triangular shape or an octagonal shape, a circular shape, or an oval shape.

The open frontal area of the cells is preferably 30 to 90%, more preferably 40 to 90%, and especially preferably 50 to 90%. When the open frontal area of the cells is less than 30%, the pressure loss tends to increase. When the open frontal area of the cells exceeds 90%, the strength of the honeycomb structure part 6 tends not to obtain sufficiently. The "open frontal area of the cells" in the present specification is the ratio (percentage ratio) of the total cross-sectional area of all of the cells 4 to the whole cross-sectional area of the honeycomb structure part 6 in a cross section perpendicular to the cell extending direction of the honeycomb structure part 6.

The thickness of the outer peripheral wall 7 is not particularly limited. The thickness of the outer peripheral wall 7 is preferably 0.025 to 0.500 mm, more preferably 0.050 to 0.475 mm, and especially preferably 0.075 to 0.450 mm. When the thickness of the outer peripheral wall 7 is 0.025 mm or more, the structural strength of the outer peripheral wall 7 can be hold. When the thickness of the outer peripheral wall 7 exceeds 0.500 mm, the pressure loss tends to increase.

The shape of the honeycomb structure part 6 is not particularly limited. A cylindrical shape, a tubular shape having an oval shaped bottom face, or a tubular shape having a polygonal shaped bottom face such as a quadrangle, a pentagonal or a hexagonal are preferable, and a cylindrical shape is more preferable. Moreover, the size of the honeycomb structure part 6 (honeycomb structure 100) also is not particularly limited. The length in the cell extending direction of the honeycomb structure part 6 (honeycomb structure 100) is preferably of 50 to 500 mm. Furthermore, when the outer shape of the honeycomb structure part 6 (the honeycomb structure 100) is cylindrical, for example, the diameter of the bottom face is preferably 50 to 800 mm.

The partition wall 5 includes cordierite as a main component. When partition wall 5 includes cordierite as a main component, it is possible to obtain a honeycomb structure having a small coefficient of thermal expansion and being superior in thermal shock resistance. When the "partition wall 5 includes cordierite as a main component", it means that 50 mass % or more of cordierite is contained in the partition wall 5.

The outer peripheral wall 7 preferably includes cordierite as a main component. When it is cordierite, it is possible to obtain a honeycomb structure having a small coefficient of thermal expansion and being superior in thermal shock resistance. The other materials of the outer peripheral wall 7, for example, may be at least one type selected from the following group. That is, as in the other materials of the outer peripheral wall 7, it may be at least one type selected from the group consisting of silicon carbide, a silicon-silicon carbide composite material, mullite, alumina, spinel, a silicon carbide-cordierite composite material, lithium aluminum silicate, and aluminum titanate.

2-2. Plugged Portion:

The plugged portions 8 are porous, and hence a plurality of pores are formed in the plugged portions 8.

Moreover, the plugged portions 8 include cordierite as a main component. When the plugged portions 8 include cordierite as a main component, it is possible to obtain a honeycomb structure having a small coefficient of thermal expansion and being superior in thermal shock resistance. When the "plugged portions 8 includes cordierite as a main component", it means that 50 mass % or more of cordierite is contained in the plugged portions 8.

The porosity of the plugged portions 8 is preferably 30 to 80%. When the porosity of the plugged portions 8 is less than 30%, the pressure loss is increased. When the porosity of the plugged portions 8 exceeds 80%, the strength of the plugged portions is too low, and the plugged portions 8 may fall out at the time of using. In addition, when the porosity of the plugged portions 8 exceeds 80%, the particulate matter is easy to leak when using the honeycomb structure 100 as a filter for trapping particulate matter. Furthermore, the porosity of the plugged portions 8 is more preferably 35 to 75%, and is particularly the most preferably 40 to 70%.

In the present specification, "porosity of the plugged portions 8" is a value measured by a mercury porosimeter.

Moreover, the porosity of the plugged portions 8, compared with the porosity of the partition wall 5, is preferably the same as or higher, more preferably higher by 2% or more, and particularly the most preferably higher by 4% or more. When the porosity of the plugged portions 8 is the same as or higher compared with the porosity of the partition wall 5, it can suppress a difference in stiffness at the boundary between the partition wall 5 and the plugged portions 8, and as a result, occurrence of cracks can be suppressed.

The average pore size of the plugged portions 8 is preferably 4 to 70 μm, more preferably 7 to 60 μm and particularly preferably 10 to 50 μm. When the average pore size is within this range, it can suppress increase in the pressure loss to keep the trapping efficiency. When the average pore size of the plugged portions 8 is less than 4 μm, the pressure loss tends to increase. When the average pore size of the plugged portions 8 exceeds 70 μm, the trapping efficiency tends to reduce.

The depth of the plugged portions 8 is preferably 1 to 25 mm, and more preferably 2 to 20 mm. Herein, the depth of the plugged portions 8 means the length in the extending direction of the cells 4 of the plugged portions 8.

EXAMPLES

The following describes the present invention by way of examples in more details, but the present invention is not limited to these examples.

Example 1

As the cordierite forming raw materials A, alumina, aluminum hydroxide, kaolin, talc and silica were used. To 100 parts by mass of this cordierite forming raw material, 1 part by mass of pore former, 32 parts by mass of dispersion medium, 6 parts by mass of organic binder and 1 part by mass of dispersant were added, and then mixed and kneaded to prepare a kneaded material. As the dispersion medium, water was used, and as the pore former, resin balloon having an average particle size of 40 μm was used. As the organic binder, hydroxypropyl methylcellulose was used, and as the dispersant, ethylene glycol was used.

Next, the kneaded material was extruded by using a predetermined die, to prepare a honeycomb formed body including partition walls defining a plurality of cells extending from a first end face to a second end face. In the honeycomb formed body, the shape of the cells in a cross section perpendicular to the cell extending direction was quadrangular, and the whole shape was cylindrical shape.

Next, the prepared honeycomb formed body was dried by a microwave dryer, and then was completely dried by a hot air dryer, to obtain the dried honeycomb formed body (honeycomb dried body). Then, both end parts of the honeycomb dried body were cut to predetermined dimensions. Incidentally, in the honeycomb dried body, a diameter at the central part in the central axis direction (cell extending direction) was the same as diameters at the end faces.

Next, a mask was attached to the first end face of the honeycomb dried body. At this time, all open areas of the cells at the first end face were covered with the mask. Next, the holes were made at predetermined portions of the mask (i.e., the parts covering predetermined cells) by irradiating the laser.

Next, the end face (the first end face), where the mask was attached, of this honeycomb dried body was directed upward, and a plugging material was continuously slid into the cell openings on the first end face side of the predetermined cells by using a rubber spatula of an automatic printer. Specifically, the plugging material prepared in advance was slide into the cell openings in a plurality of times without adding any new plugging material. In this way, the aforementioned plugging material was filled into the end parts on the first end face side of the predetermined cells (first cells).

It is to be noted that the plugging material was made of cordierite forming raw material B, 5.0 mass % of resin balloon (a copolymer of acrylonitrile having an average particle size of 40 μm and a shell wall thickness of 0.2 μm), 35 mass % of water, 2% of organic binder and 1% of dispersant. At the cordierite forming raw material B, alumina, aluminum hydroxide, kaolin, talc and silica were used. Detailed conditions on the cordierite forming raw material B are shown in Table 1. Furthermore, in the plugging material, a difference in firing shrinkage rate from the honeycomb formed body was 0.0% (Table 1). The viscosity (25° C.) of the plugging material was 280 dPa·s. The viscosity of the plugging material was measured by a rotary viscometer.

Next, a mask was attached to the second end face of the honeycomb dried body. At this time, all open areas of the cells at the second end face were covered with the mask.

faces of the honeycomb structure were 62.8%, respectively. The porosity of the partition wall was 48%. The average pore size of the partition wall was 12 μm. The "nominal diameter" means an aimed center value of the diameter for this product.

Examples 2 to 4

Honeycomb structures of Examples 2 to 4 were prepared similarly to Example 1 except that conditions were changed as shown in Table 1.

Comparative Examples 1, 2

Honeycomb structures of Comparative Examples 1 and 2 were prepared similarly to Example 1 except that conditions were changed as shown in Table 1.

TABLE 1

| | Plugging material | | | | | porosity of partition wall (%) | porosity of plugged portion (%) | ratio of dimensional difference between end face and center part (%) | difference from nominal diameter of 143.8 mm (mm) | Necessity of outer peripheral coating | thermal shock resistance difference in crack generation temperature from Ex. 1 (° C.) | judgment |
|---|---|---|---|---|---|---|---|---|---|---|---|---|
| | resin balloon (mass %)*1 | aluminum hydroxide ratio (%)*2 | talc particle dia. (μm) | silica (mass %)*1 | difference in firing shrinkage rate (%)*3 | | | | | | | |
| Ex. 1 | 5.0 | 65 | 25 | 9 | 0.0 | 48 | 65 | 0 | 0 | unnecessary | 0 | OK |
| Ex. 2 | 7.5 | 45 | 25 | 11 | 1.0 | 48 | 70 | 0.15 | 0.22 | unnecessary | 15 | OK |
| Ex. 3 | 7.5 | 45 | 25 | 13 | 2.0 | 48 | 70 | 0.35 | 0.50 | unnecessary | 25 | OK |
| Ex. 4 | 7.5 | 70 | 25 | 10 | −1.0 | 48 | 70 | −0.20 | −0.29 | unnecessary | −25 | OK |
| Comp. Ex. 1 | 7.5 | 80 | 25 | 7 | −1.5 | 48 | 70 | −0.30 | −0.43 | unnecessary | −35 | NG |
| Comp. Ex. 2 | 2.5 | 45 | 25 | 13 | 3.0 | 48 | 58 | 0.50 | 0.72 | necessary | 35 | OK |

*1 value with reference to the plugging material (100 mass %)
*2 percentage ratio (%) of content of the aluminum hydroxide to the sum of content of alumina and content of aluminum hydroxide
*3 difference between firing shrinkage rate (%) of plugging material and firing shrinkage rate (%) of honeycomb formed body Next, the holes were made at predetermined parts of the mask (i.e., the parts covering the second cells) by irradiating the laser.

Next, the end face (the second end face), where the mask was attached, of this honeycomb dried body was directed upward, and the aforementioned plugging material was continuously slide into cell openings on the second end face side of the remaining cells (the second cells) by using the rubber spatula of the automatic printer in the same manner as in the aforementioned first end face. Specifically, similarly to the case of filling the plugging material into the end part on the first end face side of the first cells, one type of plugging material prepared in advance was slid into the cell openings in a plurality of times without adding any new plugging material. In this way, the aforementioned plugging material was filled into the end part on the second end face side of the second cells.

Next, the honeycomb dried body where the plugging material was filled as stated above was dried by a hot air dryer. Then, the resultant was fired at 1,410 to 1,440° C. for 5 hours. In this way, a honeycomb structure was prepared.

The resulting honeycomb structure had a nominal diameter of 143.8 mm and a length of 152.4 mm in the central axis direction. A value (L/D) of the ratio of a length L in the central axis direction to a diameter D of the honeycomb structure was 1.06. A cell density of the honeycomb structure was 46.5 cells/cm². The thickness of the partition wall was 0.3 mm. Open frontal areas of the cells at both the end The honeycomb structures of Examples 1 to 4 and Comparative Examples 1 and 2 were evaluated for [porosity of partition wall], [porosity of plugged portions], [ratio in dimensional difference between end faces and central part], [necessity of outer periphery coating], and [thermal shock resistance]. Methods for evaluations are as follows.

[Porosity of Partition Wall]

The porosity (%) of the partition wall was measured by a mercury porosimeter (mercury intrusion technique). As the mercury porosimeter, the product name: Auto Pore III type 9405, produced by Micromeritics Corporation was used.

[Porosity of Plugged Portions]

The porosity (%) of the plugged portions was measured by a mercury porosimeter (mercury intrusion technique). As the mercury porosimeter, the product name: Auto Pore III type 9405, produced by Micromeritics Corporation was used.

[Ratio in Dimensional Difference Between End Faces and Central Part]

The "ratio in dimensional difference between end faces and central part" was calculated by the following expression (I). Then, a difference between the diameter at the end faces and the aforementioned nominal diameter of 143.8 mm ("difference from nominal diameter of 143.8 mm" in Table 1) was calculated.

Ratio in dimensional difference between end faces and central part (%)=(difference in diameter between end face parts and central part after firing−difference in diameter between end face parts and central part before firing (after drying))/143.8×100.  Expression (I)

[Necessity of Outer Periphery Coating]

When the aforementioned "ratio in dimensional difference between end faces and central part" was from −0.35 to 0.35%, [Necessity of outer periphery coating] was judged as "unnecessary", and the other cases were determined as "necessary" for [Necessity of outer periphery coating]. When [Necessity of outer periphery coating] is determined as "unnecessary", the "ratio in dimensional difference between end faces and central part" is within 0.00% or in the vicinity thereof, and hence there is no need to grind the outer periphery of the honeycomb structure after firing, and then performing the outer periphery coating.

[Thermal Shock Resistance]

The honeycomb structure was used as a DPF, and soot depositing amount was increased successively to perform regeneration (combustion of soot), and then the limit where crack occurs was checked. Firstly, a non-thermally expandable ceramic mat as a holding material was wrapped around the outer periphery of the honeycomb structure, and the resultant was inserted into a canning body of stainless steel (SUS 409) to prepare a canning structure. Then, combustion gas including soot generated by burning of the diesel fuel (light oil) was allowed to flow from one end face (the first end face) of the honeycomb structure and to flow out from another end face (the second end face), to deposit the soot in the honeycomb structure. After the honeycomb structure once was cooled to a room temperature (25° C.), the combustion gas at 650° C. was allowed to flow from the first end face of the honeycomb structure. At this time, when pressure loss of the honeycomb structure was reduced due to the combustion of the soot, the flow amount of the combustion gas was reduced to burn the soot quickly. After such quick burning, whether crack occurs in the honeycomb structure was checked. When no cracks generation was confirmed, the soot depositing amount was increased successively again to perform regeneration (combustion of soot), and then increasing the temperature generated inside of the honeycomb structure. During this series of test, the highest temperature where no cracks occurred was "thermal shock resistance temperature". Moreover, the column of "evaluation" in the "evaluation of thermal shock resistance" shows "OK (pass)" when the thermal shock resistance temperature was 1,260° C. or higher and shows "NG (failure)" when the thermal shock resistance temperature was less than 1,260° C. Table 1 shows a difference in thermal shock resistance temperature from the honeycomb structure of Example 1.

[Considerations]

Examples 1 to 4 did not need to include the outer periphery coating, and had favorable thermal shock resistance. On the other hand, Comparative Example 1 had poor thermal shock resistance. Comparative Example 2 needed to include the outer periphery coating.

The present invention is applicable to a method for manufacturing a honeycomb structure capable of using as an exhaust gas purification filter, and a honeycomb structure.

DESCRIPTION OF REFERENCE SYMBOLS

2: first end face
3: second end face
4: cell
4a: first cell
4b: second cell
5: partition wall
6: honeycomb structure part
7: outer peripheral wall
8: plugged portion
100: honeycomb structure

What is claimed is:

1. A method for manufacturing a honeycomb structure, comprising:
   a honeycomb formed body preparing step of extruding a kneaded material obtained by kneading a forming raw material containing a cordierite forming raw material A into a honeycomb shape, to prepare a honeycomb formed body having porous partition walls defining a plurality of cells extending from a first end face as one end face to a second end face as another end face;
   a plugged honeycomb formed body preparing step of filling cell openings of the prepared honeycomb formed body with a plugging material which includes a forming raw material containing a cordierite forming raw material B and resin balloon of 1.0 to 15 mass % and has a difference in firing shrinkage rate of −1.0 to +2.0% from the honeycomb formed body, to prepare a plugged honeycomb formed body; and
   a honeycomb structure preparing step of firing the prepared plugged honeycomb formed body to prepare a honeycomb structure provided with porous plugged portions at an end part on a first end face side of a first cell as a predetermined cell and at an end part on the second end face side of a second cell as a remaining cell, among the plurality of cells,
   wherein a porosity of the porous plugged portions is greater than a porosity of the porous partition walls of the honeycomb formed body, and
   wherein a composition of raw material A is different from a composition of raw material B.

2. The method for manufacturing a honeycomb structure according to claim 1,
   wherein the cordierite forming raw material B includes alumina and aluminum hydroxide, and
   a percentage ratio of mass of the aluminum hydroxide to sum of mass of the alumina and the mass of the aluminum hydroxide contained in the cordierite forming raw material B is 20 to 100%.

3. The method for manufacturing a honeycomb structure according to claim 1, wherein the cordierite forming raw material B includes talc having an average particle diameter of 5 to 30 μm.

4. The method for manufacturing a honeycomb structure according to claim 1, wherein the cordierite forming raw material B includes 5 to 20 mass % of silica.

5. The method for manufacturing a honeycomb structure according to claim 1, wherein the cordierite forming raw material B includes silica having an average particle diameter of 1 to 5 μm.

6. A honeycomb structure obtained by the method for manufacturing a honeycomb structure according to claim 1.

7. The method for manufacturing a honeycomb structure according to claim 1, wherein the content of resin balloon is 5 to 7.5 mass %.

8. The method for manufacturing a honeycomb structure according to claim 2, wherein the percentage ratio of mass of the aluminum hydroxide to sum of mass of the alumina and the mass of the aluminum hydroxide contained in the cordierite forming raw material B is 45 to 70%.

9. The method for manufacturing a honeycomb structure according to claim 1, wherein the content of silica in the cordierite forming raw material B is 9 to 13 mass %.

10. The method for manufacturing a honeycomb structure according to claim 1, wherein the porosity of the porous plugged portions is at least 17% greater than the porosity of the porous partition walls of the honeycomb structure.

11. The method for manufacturing a honeycomb structure according to claim 1, wherein the content of resin balloon in the plugging material is 5 to 15 mass %.

12. The method for manufacturing a honeycomb structure according to claim 1, wherein the percentage ratio of mass of the aluminum hydroxide to sum of mass of the alumina and the mass of the aluminum hydroxide contained in the cordierite forming raw material B is 20 to 70%.

13. The method for manufacturing a honeycomb structure according to claim 1, wherein the content of silica in the cordierite forming raw material B is 11 to 20 mass %.

* * * * *